United States Patent [19]

Hayward

[11] Patent Number: 5,500,239
[45] Date of Patent: Mar. 19, 1996

[54] METHOD AND APPARATUS FOR THE MANUFACTURE OF A PET FOOD PRODUCT HAVING A FIBROUS STRIATED STRUCTURAL MATRIX

[75] Inventor: Larry H. Hayward, Topeka, Kans.

[73] Assignee: Colgate Palmolive Company, New York, N.Y.

[21] Appl. No.: 404,709

[22] Filed: Mar. 15, 1995

[51] Int. Cl.$^6$ .............................. A23P 1/00; B29C 47/00
[52] U.S. Cl. ..................... 426/516; 425/191; 425/192 R; 425/198; 425/464; 426/448; 426/805
[58] Field of Search ..................................... 426/516, 448, 426/449, 805; 425/191, 192 R, 197, 198, 464

[56] References Cited

U.S. PATENT DOCUMENTS

| | | | |
|---|---|---|---|
| 4,438,146 | 3/1984 | Colby et al. | 426/448 |
| 4,457,685 | 7/1984 | Huang et al. | 425/191 |

*Primary Examiner*—George Yeung
*Attorney, Agent, or Firm*—Paul Shapiro

[57] ABSTRACT

A method and apparatus for the manufacture of a pet food having a transverse, fibrous striated matrix which imparts a superior mechanical cleaning action to the teeth of a pet when chewed. The apparatus includes an extruder through which a fiber bearing food mixture is advanced, the discharge outlet end of which is equipped with a die assembly which induces a state of laminar flow in the food material stream. The die assembly is constructed of a first spacer plate having an annular opening positioned to receive and stabilize the food stream advanced through the die assembly. A breaker plate adjacent to the first spacer plate, receives the flow stabilized food stream and effects a first, discontinuous, alignment of the fibers in the stream. A second spacer plate receives the food stream discharged form the breaker plate. The second spacer plate has a length at least twice that of the first spacer plate, whereby the fibers in the food stream are aligned into a continuous transversely aligned state. Thereafter the food stream is advanced through orifices of a die plate positioned to receive the food ingredient mixture discharged from the second spacer plate. By advancing the fiber bearing food stream sequentially through each of the components of the die assembly a state of laminar flow induced in the food mixture whereby an extrudate having a transverse fiber striated matrix is obtained.

12 Claims, 2 Drawing Sheets

5,500,239

METHOD AND APPARATUS FOR THE MANUFACTURE OF A PET FOOD PRODUCT HAVING A FIBROUS STRIATED STRUCTURAL MATRIX

BACKGROUND OF THE INVENTION

1. Field of the Invention

The present invention is concerned with a method and apparatus for the manufacture of a pet food product having a fibrous striated structural matrix which when chewed by pets such as dogs and cats, imparts an improved mechanical dental cleansing benefit to the pets teeth. More particularly, it is concerned with such a method and apparatus making use of an extruder device equipped with a die assembly operable to induce a state of laminar flow in an extruded pet food material to form an extrudate having a fibrous, striated structural matrix.

DESCRIPTION OF THE PRIOR ART

Animal pets, such as dogs and cats, like their human counterparts, are subject to dental health problems. These problems can be traced to the formation of bacterial plaque which forms on the exterior surface of teeth. Plaque is a gelatinous mass of sticky film of bacteria, polysaccharides and salivary proteins which is not easily washed away. Bacteria that produce the acid for the caries process are held to the tooth surface by the plaque matrix as well as other bacterial agents which cause redness and swelling (gingivitis). The presence of these bacteria, if left untreated, may spread to cause malodor, periodontal disease, gingival pockets and bone loss.

Dental calculus, or tartar, is the result of the thickening and hardening (mineralization) of dental plaque. Tartar which is not easily removed accumulates on the tooth surface, mainly at the gingival margin. It is a hard mineral deposit containing predominantly calcium and phosphate, very tightly bound to the tooth surface. Once it is formed, tartar is extremely difficult to remove except by a veterinary professional. Tartar can become unsightly if growth is left unimpeded, and elimination is desirable as the porous surface of the calculus will be covered by a thin layer of unmineralized plaque which can cause constant irritation of the gums.

Commercial pet foods, when chewed by the pet, do not provide sufficient mechanical surface cleaning to teeth to adequately remove plaque and tartar which forms on the pet's teeth.

In copending application Ser. No. 07/899,534, filed Jun. 16, 1992, now U.S. Pat. No. 5,431,927 issued Jul. 11, 1995 and assigned to a common assignee, the disclosure of which is herein incorporated by reference, there is disclosed a nutritional pet food product formed from an ingredient mixture of carbohydrate, fat, protein and fiber bearing materials which is effective to mechanically remove tartar and plaque when chewed by pet animals such as dogs and cats. The pet food product disclosed in application Ser. No. 07/899,534 is an extruded product having a fibrous, transversely striated structural matrix which, when chewed by the animal, effectively removes tartar and plaque from the animal's teeth through a superior mechanical cleansing action. When chewed, the extruded product fractures along transverse striations formed in the product matrix whereby the animal's teeth are retained in increased abrasive contact with the fractured layers, the teeth being abraded and mechanically cleaned by the surfaces of the fractured layers as the product is chewed by the animal.

The fibrous striated pet food product of application Ser. No. 07/899,534 is manufactured by an extrusion process wherein the fiber containing food ingredient mixture is formed into an expanded, product having a transverse fibrous striated matrix by moving the mixture under plasticizing mechanical agitation and increasing levels of temperature and shear to form a flowable mass which is advanced through the shaped orifice walls of a die plate, the internal walls of the orifices thereof being coated with a layer of material, such as Teflon, having a coefficient of friction no greater than 0.2, so that a flow state resembling laminar flow is created. Due to the creation of the laminar flow state, the plasticized product is extruded as a continuous product strand in a stratified condition with the fiber bearing ingredient forming transverse striations in the product matrix. The strand of striated product is then segmented into discrete pieces or pellets and dried upon exit of the strand from the extruder.

Although the use of a die plate in which the internal orifice walls thereof are coated with a layer of low friction coefficient material is effective for creating a state of laminar flow during the extrusion process, the coated surfaces suffer from the disadvantages of being costly to manufacture and the coating is easily damaged and has a short life span when used in the extrusion of fibrous striated food products.

SUMMARY OF THE INVENTION

The present invention overcomes the problems outlined above and provides a method and apparatus for the manufacture of a pet food having a fibrous striated matrix without the use of coated dies. The apparatus of the invention includes an extruder device in the form of a tubular barrel having an inlet end and an outlet end, with screw means situated within the barrel for mixing and advancing the food product ingredients from the inlet to the outlet end.

The extruder barrel is equipped with a die assembly including an annular die plate affixed to and in communication with the outlet end of the barrel and forming an extension thereof. The die plate has a plurality of shape-defining orifices for forming a striated extrudate from a stream of food ingredients including fiber bearing ingredients advanced through the orifices in a state of laminar flow.

To induce a condition of laminar flow in the fiber bearing food ingredient mixture being extruded through the orifices of the die plate, the die assembly also includes a pair of spacer plates of varying thickness having interposed therebetween a perforated breaker plate provided with a series of uniform openings through which the advancing food product ingredients are passed before discharge from the die plate.

As will hereinafter described, the specific arrangement of the die assembly components of the present invention is critical to obtaining the fibrous striated pet food product by the creation of a state of laminar flow in the fiber bearing food mixture stream being advanced to the die plate whereby transverse fiber alignment in the extruded food product is achieved during discharge of the extrudate from the die orifices, without the presence on the internal walls thereof of a low coefficient of friction coating.

DESCRIPTION OF THE PREFERRED EMBODIMENTS

Figure 1:
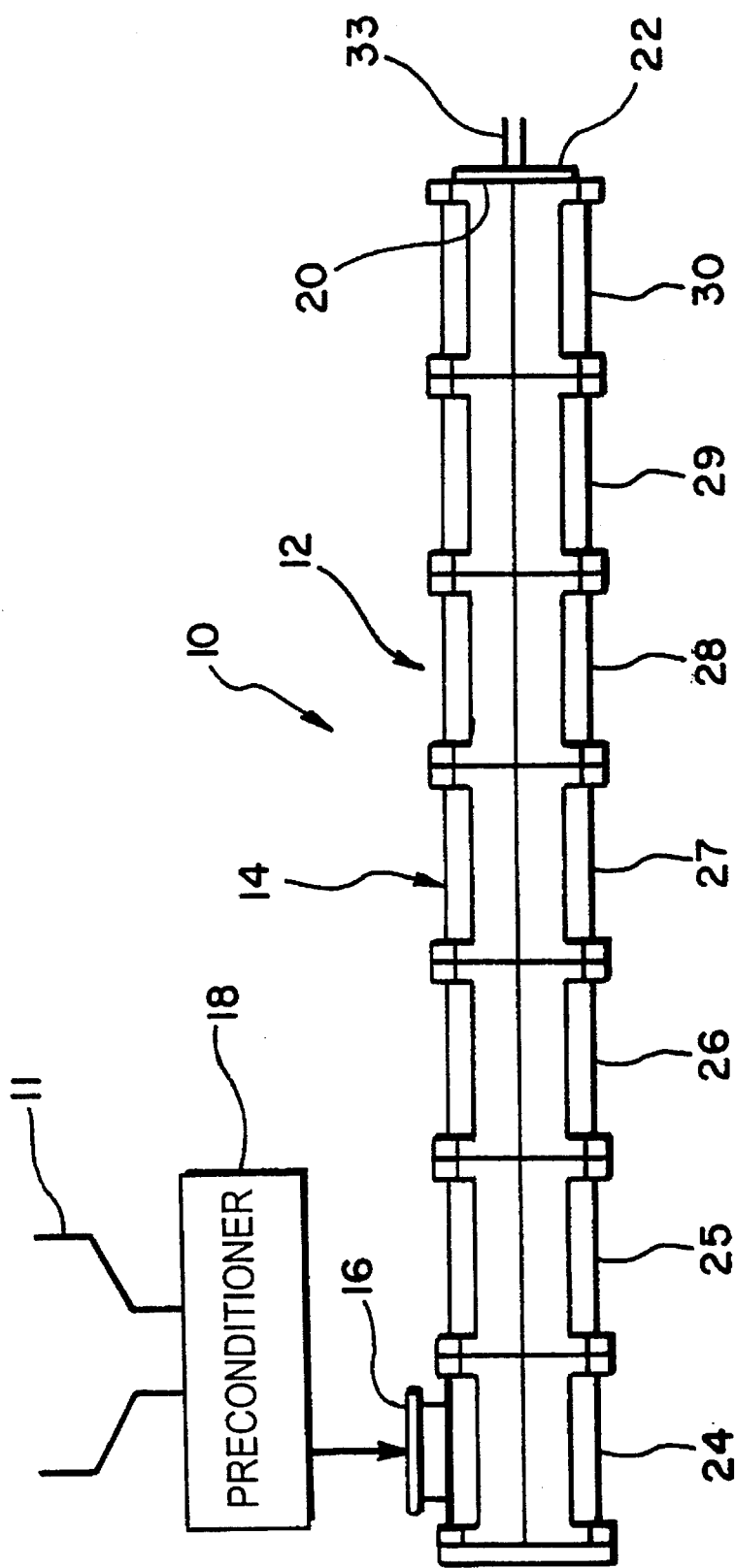
FIG. 1 is a schematic representation of an extrusion device used in the practice of the present invention.

To manufacture a fibrous striated food product in accordance with the practice of the present invention, there is employed a heatable extruder having one or more transfer screws within a closed heatable barrel equipped with the die assembly of the present invention at the outlet end of the barrel. The barrel, in conjunction with the screw and die assembly creates during operation a closed chamber which prevents the release of existing water vapor from the food product and system. A food product mixture of carbohydrate, protein, fat and fiber bearing ingredients is first preconditioned and moisturized with steam and water and then subjected to a plasticizing combination of temperature, shear and pressure in the extruder barrel whereby the ingredient mixture is converted into a flowable mass. The advancing food mixture mass builds up sufficient shear to cause the plasticized mixture to be advanced at the desired temperature and pressure to and through the orifices of the die assembly.

The plasticized food mixture entering the die assembly is subjected to compression and temperature sufficiently high so that the mixture is cooked as it flows through the die assembly. During the passage of the plasticized mixture through the die assembly, the configuration and arrangement of the die assembly components of the present invention induces a condition of food mixture flow which approximates laminar flow.

The die assembly of the present invention used to induce the laminar flow state is comprised of a die plate having a plurality of shape defining orifices and a back-up means whereby the fibers contained in the plasticized food product are aligned transversely in the extrudate matrix, the back-up means being comprised of a pair of first and second spacer plates of varying thickness and a perforated breaker plate interposed between the spacer plates. The first spacer plate functions to modulate the turbulence of the food stream being advanced to the die assembly. The breaker plate is provided with a plurality of orifices of a size and configuration which are adapted to cause a disjointed alignment of the fibrous material in laminar sections in the plasticized food product. The second spacer plate functions to reform the laminar sections whereby a fiber aligned mass is presented to the orifices of the die plate.

Laminar flow is distinguished from turbulent flow which is the normal flow condition of extruded plasticized food products. In turbulent flow, fluid elements are in chaotic motion, and small random fluctuations in the velocity at a point will exist even though the average means velocity may remain constant along its axis. Laminar flow is a flow with constant preparation of streamlines so that constant velocity surfaces remain at constant separation and laminae or sheets of fluid slide frictionless over one another. By creating conditions during the extrusion of the fiber bearing food ingredient mixture resembling laminar flow, the fiber bearing ingredients in the food product are aligned in transverse striations in the extruded food product matrix. In contrast, fiber-containing food products which are extruded under conditions of turbulent flow contain the fibrous ingredients randomly distributed in the extruded food product matrix. Such food product, when chewed by an animal, crumbles rather than fractures and exerts a limited, inferior mechanical cleaning action on the pet animal's teeth.

By the use of the die assembly of the present invention, conditions resembling laminar flow are induced during the discharge of the fiber containing plasticized food product through the uncoated orifices of the die plate of the die assembly and as a result, an extrudate having a striated structural matrix is obtained; i.e., the extrudate product has fibrous striations transversely aligned through the product microstructure.

The fibrous striated food product manufactured in accordance with the present invention when chewed by an animal, unlike baked or other extruded products, does not crumble, but instead fractures along the fibrous striations in the food product matrix and thereby provides the animal with superior teeth cleansing benefits stemming from the mechanical cleansing and other abrasive contacts with the separated matrix layers in the chewed striated product. In addition, as the striated fibrous product does not crumble as the animal chews on the product, the product clings in adhered contact with the pet's teeth for an extended time prolonging the mechanical dental cleansing action.

The fibrous, striated product prepared by the method of the present invention has a density of about 10 to about 35 pounds per cubic foot (lbs./ft.$^3$) and a typical ingredient content as follows:

| Ingredient | % by Weight |
| --- | --- |
| Carbohydrate | about 35 to about 70 |
| Protein | about 10 to about 35 |
| Fat | about 10 to about 20 |
| Fiber | about 10 to about 25 |
| Nutritional balancing agents such as vitamins and minerals | about 0.01 to about 0.40 |

In preparing the final pet food product, the moisture content of the extrudate is adjusted to the range of about 5 to about 11% and preferably about 7 to about 9%. At moisture levels below 5% the product becomes too hard to be easily chewed by the animal and for this reason moisture levels less than 5% in the product are to be avoided. At moisture levels above about 11%, the hardness of the product begins to decrease to levels at which the mechanical cleaning efficacy of the striated product begins to be compromised. Maximum mechanical cleaning efficacy of the striated product is achieved at a density preferably of about 15 to 25 lbs./ft$^3$ and a fiber level preferably about 15 to about 20% by weight. At these fiber levels the product has the desired degree of striation to achieve the desired degree of tooth clinging characteristics.

Suitable ingredients which may be used to prepare the pet food product of the present invention generally contain substantial amounts of animal protein derived from poultry by-products and high protein plant sources such as soybeans as well as fiber derived from sugar beet, soy and pure cellulose and substantial amounts of carbohydrates provided by cereals and grains such as wheat and rice as well as fats (animal or vegetable) such as tallow or soy oil. Small amounts of vitamins, minerals, salts, flavorings and preservatives are also generally included in the food product of the present invention to provide nutritional balance and palatability. A typical pet food product of the present invention is prepared from a mixture of the following ingredients:

| Ingredient | % by Weight |
| --- | --- |
| Corn (ground) | 10–30 |
| Rice Flour | 30–50 |
| Cellulose Fiber | 10–25 |
| Poultry By-product Meal | 10–15 |
| Inorganic Salts (NaCl, KCl, Ca$_2$SO$_4$) | 0.5–2.0 |
| Vitamins | 0.01–0.2 |
| Minerals | 0.01–0.2 |
| Preservative | 0.01–0.2 |

In preparing the extruded fibrous striated matrix pet food product by the method of the present invention, a mixture of carbohydrates, vegetable and animal protein, fat, fiber and sufficient vitamins and minerals selected to yield a nutritionally balanced diet is mixed and preconditioned or moisturized within a preconditioner or mixing cylinder wherein the ingredients are contacted with steam and moisture. The moisturized mixture is then introduced into the barrel of an extruder, which can be either a single or twin screw type extruder, which cooks the mixture to yield an extruded product. The extruder barrel is provided with at least one helical screw which axially rotates to advance the material through the extruder barrel.

Preferred processing conditions involve initially preconditioning dry food ingredients to uniformly moisturize and precook materials and form an at least partially sterilized mixture for passage into the apparatus of the present invention. In this connection, preconditioning of this type normally involves injection of water and/or steam with intense mixing. Advantageously, the moisture level of the initially dry ingredients ranges from about 10–14% by weight, and, after preconditioning, this moisture level is typically elevated to a level of from about 20–30% by weight, and more preferably from about 20–25% by weight, MCWB (moisture content, wet basis).

In terms of temperature, it is preferred to elevate the temperature of the mixture in the preconditioner to a level of from about 160–210° F., and more preferably from about 190–205° F. The residence time of the mixture within the preconditioner will depend upon the equipment selected and the degree of mixing desired; generally speaking, however, the average residence time of the food mixture in the preconditioner should be from about 0.5–8 minutes, and more preferably from about 4–7 minutes.

After preconditioning, the food mixture is fed into the extruder barrel and is conveyed by the screw toward the outlet end of the barrel. The temperature of the food mixture within the barrel is generally maintained at about 165–240° F., and preferably from about 180–240° F.

During passage through the extruder, the food mixture is subjected to increasing amounts of shear and pressure. The maximum pressure conditions achieved in the extruder barrel generally ranges from about 100–1000 psi, and preferably from about 125–215 psi. The screw rpm (revolutions per minute) generally ranges from about 350–500 rpm. Also during such passage, moisture may be added directly to the food material passing through the barrel, in the form of injected water and/or steam.

The food mixture exiting the extruder barrel outlet passes directly into the die assembly of the present invention, whereupon the mixture is forced outwardly as a strand through the orifices of the die plate in a state of laminar flow. The extrudate strand is then sliced into appropriate sized pieces by rotating knives or other suitable cutting means. The moisture level of the sliced pieces is from about 15–25% by weight, and more preferably from about 18–22% by weight.

Figure 2:
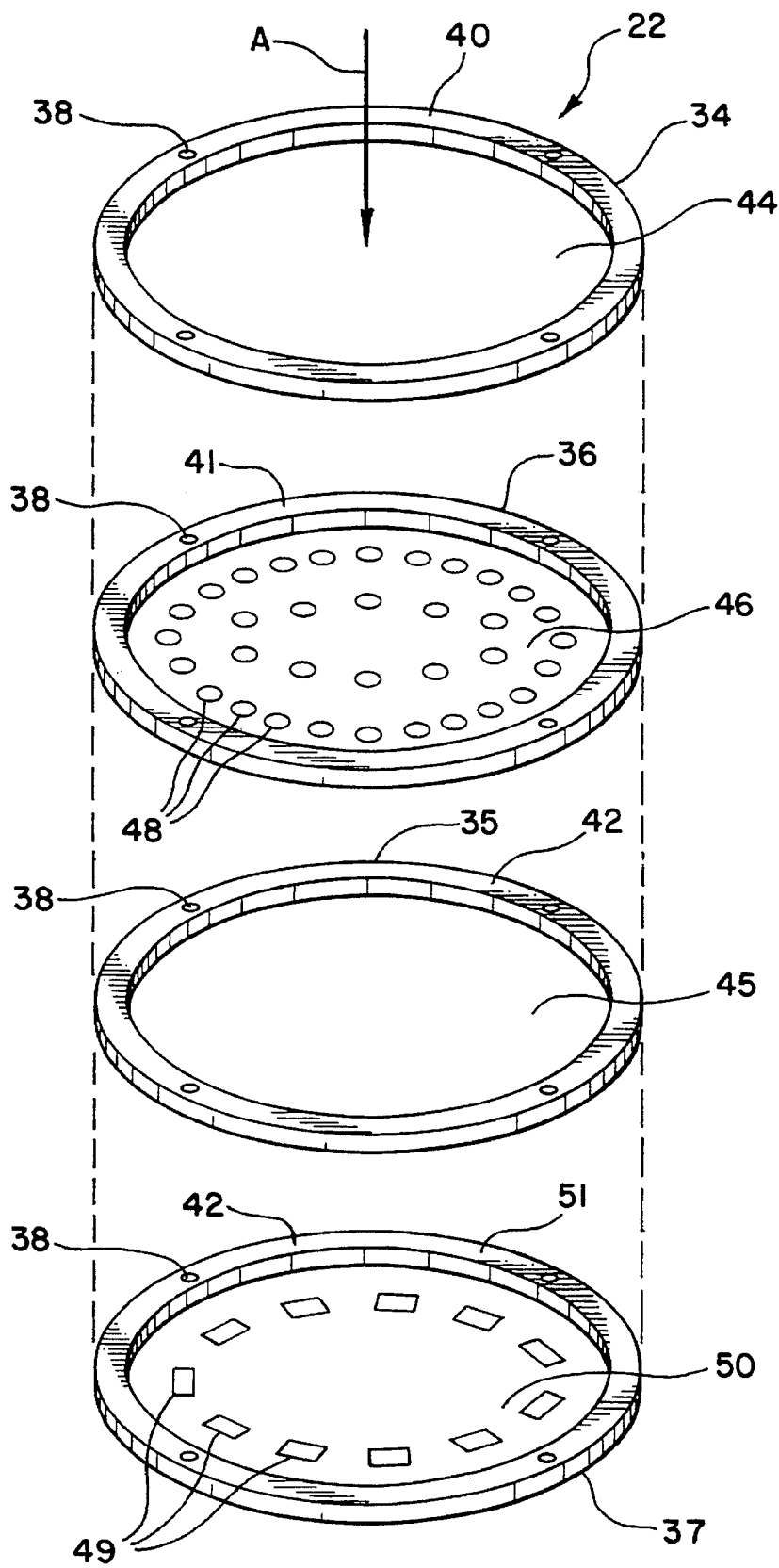
FIG. 2 is a schematic representation (exploded for illustration purposes) of a die assembly used in the present invention for the manufacture of fibrous, striated pet food products.

Turning now to FIGS. 1–2, in FIG. 1 the extrusion apparatus 10 includes an extruder 12 having a barrel 14 with an inlet 16 located below the outlet of a preconditioner 18; the extruder 12 also having an outlet 20 to which is affixed a die assembly 22. Hopper 11 is provided to premix the ingredients prior to preconditioning. The barrel 14 as depicted in FIG. 1 comprises seven barrel sections 24, 25, 26, 27, 28, 29, 30, although the number of barrels may vary without departing from the principles of the present invention. The barrel sections are interconnected to provide an elongated bore through the barrel 14 of the extruder 12. Two co-rotating, flighted material advancing screws (not shown) are received in the bore of the barrel and are intermeshed along the majority of the length of the extruder barrel 14 and terminate at outlet 20. The screws feed the food mixture to and through the die assembly 22 at an appropriate velocity and in a state of laminar flow. Extrusion apparatus 10 of the type illustrated in FIG. 1 is available from the Wenger Manufacturing Company such as the Wenger TX 138 Twin Screw Extruder. The pre-conditioner 18 shown in FIG. 1 is also manufactured by the Wenger Manufacturing Company.

In preparing the striated product of the present invention, the ingredients from which the striated food product is extruded are first mixed in a mixer such as a ribbon mixer and fed to hopper 11. The mixed ingredients are metered into the preconditioner 18, at a rate between 100 and 170 lbs./min. and is further mixed with water which is introduced into the preconditioner at a rate of 12 to 15 lbs./min. The temperature of the mixture is raised from ambient to 170° to 210° F. by the injection of steam into the preconditioner 18 at the rate of 6 to 9 lbs./min. Total residence time in the preconditioner 18 generally ranges from 0.5 to 2.5 minutes.

Once the mixture of the ingredients and water is introduced into the extruder barrel 14, the mixture is advanced along the length of the barrel 14 by axial rotation of the screws. The mixture is sequentially advanced through the extruder and finally through the die assembly 22.

The die assembly 22 as shown in FIG. 2 consists of breaker plate 36 and a die plate 37 mounted in clamped parallel engagement between first and second spacer plates 34 and 35. These plates are mounted on the outlet end 20 of the extruder barrel 14 by a plurality of bolts (not shown) which extend through bolt receiving holes, designated generally by the numeral 38, formed on the peripheral faces 40, 41, 42 and 43 of the aforementioned plates.

The first spacer plate 34 shown in FIG. 2 has an annular opening 44 which extends through the plate 34 and corresponds in diameter to the annular opening 45 of the second spacer plate 35. The diameter of the annular openings 44 and 45 of the spacer plates 34 and 35 is generally about 3.5 to about 4.5 inches and preferably about 3.75 to 4.25 inches.

The annular opening 44 of the first spacer plate 34 is of sufficient length along the axis of extrusion to stabilize and streamline, i.e., impart a more smoother flow to, the plasticized food mixture stream being advanced therethrough causing the fibrous material in the food mixture to be compressed to a dense, randomly structured, plastic state. Typically the spacer plate 34 has a length of about 0.25 to about 1.0 inch, preferably about 0.35 to about 0.75 inch to provide for such food stream stabilization.

Breaker plate 36 which is clamped between first spacer plate 34 and second spacer plate 35 is comprised of a plurality of annular openings generally designated by the numeral 48 which are cut into and extended through the core 46 of plate 36. The diameter of core 46 of the breaker plate 36 corresponds to the diameter of the annular openings 44 and 45 of the spacer plates 34 and 35.

Preferably the annular openings 48 of the breaker plate 36 are of sufficient length along the axis of extrusion to separate and align the food structure in a preliminary pieced laminar configuration as the food mixture is advanced therethrough under pressure. An appropriate length of annular opening 48 to achieve this preliminary alignment in the fiber bearing food mixture flowing therethrough is about 0.25 to 1.0 inches and preferably about 0.3 to 0.7 inches.

The annular opening 45 of the spacer plate 35 is of sufficient length along the axis of extrusion to allow the individual laminar pieces to reform under pressure and present a fiber aligned mass to the orifices generally designated by the numeral 49 cut into the core 50 of the die plate 37.

An appropriate length of the annular opening 45 of spacer plate 35 required to obtain the desired fiber alignment is generally at least twice that of the length of the opening of the first spacer plate 34 and preferably about 2.1 to 3.0 times their length, the length of the spacer plate 35 generally being in the range of about 1.1 to about 2.0 inches and preferably about 1.4 to about 1.8 inches.

The die orifices 49 of the die plate 37 are sufficient length along the axis of extrusion to promote the final alignment of the fibrous material in the food product mixture so that an extrudate having a fibrous striated matrix is extruded therefrom. An appropriate length of orifice 49 to promote fiber alignment in the food product extrudate is about 0.5 to about 1.5 inches and preferably about 0.66 to about 1.0 inches.

The individual die orifices 49 preferably are tapered and decrease in two dimensions, width and thickness, from the entrance end to discharge end. Generally the orifice width ranges about 0.25 to 1.25 inches and preferably about 0.70 to 1.1 inches at the widest entrance end facing the spacer plate 35 to about 0.1 to 0.9 inches and preferably 0.5 to 0.8 inches in width at the narrowest end or discharge end. Generally the orifice thickness ranges about 0.25 to 0.75 inches and preferably about 0.4 to 0.65 inches at the widest entrance end facing the spacer plate 35 to about 0.1 to 0.55 inches and preferably about 0.25 to 0.4 inches in thickness at the narrowest end or discharge end.

The tapering of the die orifices 49 allows the aligned fibers in the extrudate to be compressed gradually before being cut into the appropriate length upon discharge from the orifices 49. The die orifices 49 may each have a specific shape which is the desired shape for the fiber striated pet food product.

As the fiber bearing pet food mixture flows through die orifices 49, it assumes the shape of the orifices. For example, if a square-shaped food product is desired, die orifices 49 can be provided with square-shape to impart such shape to the product. Preferably, die orifices 49 are circular or rectangular in shape and have die inserts inserted into them. Die inserts function to provide the desired shape to the product. By use of die inserts, die plate 37 need not be made specific for each particular shape desired, but, rather, die inserts can be produced for each particular shape. When a different shape than the one currently being produced is desired, die inserts can then be replaced, thereby eliminating the need for the replacement of die plate 37.

Die plate 37 preferably further comprises flange 51 which can be used to secure die plate 37 the outlet 20. Flange 51 most preferably has holes which correspond to the holes in complementary flanges on plates 34, 35 and 36 and the outlet 20. Bolts (not shown) or other conventional securing means can be disposed through the holes in die flange 51 and the corresponding holes of the other plates to secure die plate 37 to the die outlet.

The size of the food product formed by the orifices 49 of die plate 37 can be any desired by the skilled artisan. Generally, it has been found that food pieces which have a major dimension (i.e., top of the piece to bottom of the piece) of greater than about 1.5 inches are larger than can be comfortably consumed by smaller pets such as small dogs, while food pieces which have a major dimension less than about 0.3 inches do not convey the visual image desired in a pet food having visually distinct regions. Typically the food pieces have a length of about 0.7 to 1.30 inches, a width of 0.75 to 1.25 inches and a thickness of 0.5 to 0.75 inches.

The components of the die assembly 22 can be made of any material providing the required structural integrity and sanitary characteristics such as a metal like stainless steel. Other characteristics which should be present in the material include thermal stability and corrosion resistance and approval from the United States Food and Drug Administration or other such agency for contact with food products is also beneficial.

The extrudate 33 as it is discharged from the orifices 49 of the die plate 37 is formed into food pieces by a slicing means (not shown) such as a rotating knife assembly which functions to slice the extrudate streams as they are discharged from the orifices 49 to form the striated product of this invention.

By flowing the food ingredient mixture through the die assembly 22 in accordance with the practice of the present invention at a velocity of about 12 to about 20 inches per second (in./sec.) a condition resembling laminar flow is created in the extrudate. As the food ingredient mixture passes through the barrel sections 24, 25, 26, 27, 28, 29, and 30, it is mixed, cooked and subjected to barrel temperatures in the range of about 100° to about 250° F. preferably about 170° to about 210° F. The food mixture is flowed through the die assembly 22 at a temperature of about 240° to about 320° F. Total residence time in the die assembly 22 is about 0.10 to about 0.35 seconds.

The extrudate strand 33 as it leaves the die assembly 22 has a moisture content between about 15 and about 30% by weight and preferably about 17 to about 24% by weight. The extruded strand 33 swells upon exiting the die assembly 22 due to flashing of moisture to steam producing an expanded, fibrous striated structure. The strand is cut into appropriate lengths to form pieces and then placed in an oven at 190° to 230° F. for 15 to 30 minutes to dry to about 7 to about 9% moisture.

The invention is further illustrated by the following specific but non-limiting Example.

EXAMPLE

A solid, pelletized, nutritionally balanced dog food product having a fibrous striated structural matrix was prepared using the method and apparatus of the present invention by first mixing the following ingredients:

| Ingredient | Weight Range % |
|---|---|
| Brewers Rice | 35 |
| Yellow Corn | 20 |

-continued

| Ingredient | Weight Range % |
| --- | --- |
| Cellulose Fiber | 10 |
| Poultry by-product meal | 10 |
| Sodium Chloride | 0.3 |
| Potassium Chloride | 0.3 |
| Calcium Sulfate | 0.5 |
| Choline Chloride | 0.1 |
| Vitamin Mix | 0.12 |
| Mineral Mix | 0.03 |
| Ethoxyquin (Preservative) | 0.02 |

The ingredients were blended in a ribbon mixer for five minutes and milled through a hammer mill having screen size of 3/64 inch to 5/64 inch.

The milled mixture was fed to the hopper 11, of a Wenger twin screw extruder Model No. TX-138 equipped with a preconditioner 18. The TX-138 extruder was of the type schematically illustrated in FIG. 1 and was provided with two rotatable, flighted material advancing screws and had a total of 7 barrel sections and terminated in an outlet to which was mounted a die assembly 22 of the type illustrated in FIG. 2.

The mixture, having a moisture content of 10.4%. was fed to the preconditioner 18 at a rate of 120 lbs./min. The mixture was raised in temperature to 178–185° F. By the injection of steam introduced at a rate of 7.5 lbs./min. into the preconditioner 18. Water was introduced into the preconditioner 18 at the rate of 13.5 lbs./min.

The preconditioned mixture was fed into the inlet 16 of the extruder barrel 14. The extruder screws were rotated at a speed of 400 rpm.

Temperatures of the extruder barrel sections were maintained at 140–190° F., 180–200° F., 180–200° F., 185–205° F., 220–250° F. and 220–250° F. for the second, third, fourth, fifth, sixth and seventh, barrel sections respectively. The mixture was advanced through orifices 49 of the die plate 37 at a temperature of 270° F., and a velocity of 17.9 in./sec.

Product rate through the die orifices was 133.3 lbs./min. The first spacer plate 34 of the die assembly had a single annulus 4 inches in diameter and a length of 0.5 inch. The breaker plate 36 had a core having a diameter of 4 inches which contained 37 holes each having a diameter of 0.438 inch. The second spacer plate 35 had a diameter of 4 inches and a length of 1.375 inches. The die plate had 9 orifices, each orifice being 0.29×0.51 inches. The extrudate issued from the die orifices in the form of a strand 0.75 inch in diameter. The extruded strand product 33 swelled and expanded upon issuing from the die orifices due to moisture in the extrudate flashing to steam. The expanded, extruded strand was cut into 0.50 inch thick rectangular shaped pieces. The pieces had a water content of about 19% by weight. The pieces were then conveyed to a forced air drying system and the moisture level reduced to 7–9% by weight at a temperature of 190° F. The dried pieces had a density of 18 lbs./ft$^3$, a length of 0.85 inch and a thickness of 0.62 inch. The dried pieces had an expanded structural matrix with fibrous striations transversely aligned through the microstructure substantially identical to pieces which had been previously manufactured using Teflon coated die orifices in accordance with the method disclosed in previously discussed patent application Ser. No. 07/899,534.

What is claimed:

1. A method of producing a pet food product having fibrous striations transversely aligned through the product matrix, the method comprising:

preparing a pet food ingredient mixture containing a fiber bearing ingredient, feeding the mixture to an inlet of an apparatus comprising an extruder barrel having an outlet through which a stream of the fiber containing food mixture is advanced and to which outlet is affixed a die assembly, the die assembly comprising, in sequence, a first spacer plate having an annular passage positioned to receive the food mixture stream discharged through the outlet, the first spacer plate being of sufficient length to stabilize the food mixture stream flow, a breaker plate positioned to receive the stream of flow stabilized food mixture discharged from the first spacer plate, the breaker plate being provided with a plurality of openings for effecting a first, discontinuous, alignment of the fibers in the stream, a second spacer plate having an annular passage positioned to receive the food mixture stream discharged from the breaker plate, the second spacer plate having a length at least twice that of the first spacer plate, such length being sufficient to further align the fibers in the mixture stream to a continuous aligned state, and a die plate provided with a plurality of orifices and positioned to receive the food mixture stream discharged from the second spacer plate, advancing the fiber containing food mixture stream through each of the spacer and breaker plates and through the orifices of the die plate to induce a state of laminar flow in the food mixture stream to obtain a fiber striated extrudate, and then drying the extrudate discharged from the orifices of the die plate to obtain a pet food product having a transverse fibrous striated matrix.

2. The method of claim 1 wherein the length of the second spacer plate is about 2.1 to about 3.0 times the length of the first spacer plate.

3. The method of claim 1 wherein the orifices of the die plate are tapered.

4. The method of claim 1 wherein the food mixture stream is flowed through the die assembly at a velocity of about 12 to about 20 in./sec.

5. The method of claim 1 wherein the food ingredient mixture contains about 10 to about 25% by weight of the fiber bearing ingredient.

6. The method of claim 1 wherein the food ingredient mixture is comprised of about 35 to about 70% by weight carbohydrate, about 10 to about 35% by weight protein, about 10 to about 20% by weight fat, about 10 to about 25% by weight fiber, about 0.01 to about 0.40% by weight vitamins and materials.

7. The method of claim 5 wherein the fiber bearing ingredient is cellulose fiber.

8. The method of claim 1 wherein the extrudate is dried to a moisture level of from about 5 to about 11% by weight.

9. The method of claim 1 wherein the extrudate is dried to a moisture level of about 7 to about 9% by weight.

10. An apparatus for the manufacture of a pet food product having a transverse fibrous striated matrix from a fiber bearing food ingredient mixture, the apparatus comprising:

an extruder device including a barrel presenting an inlet end and an outlet end, and a screw means situated within the barrel for conveying a stream of the food ingredient mixture from the inlet to the outlet end;

a die assembly operatively affixed to the outlet end of the barrel and forming an extension thereof and for inducing a state of laminar flow in the food mixture stream, the die assembly being provided, in sequence, with a first spacer plate having an annular passage positioned to receive the food mixture stream discharged from the outlet end, the first spacer plate being of sufficient length to stabilize the food mixture stream flow, a breaker plate positioned to receive the stabilized food mixture stream discharged from the first spacer plate, the breaker plate being provided with a plurality of openings for effecting a first, discontinuous alignment of the fibers in the food mixture stream, a second spacer plate having an annular passage positioned to receive the food mixture stream discharged from the breaker plate, the second spacer plate having a length at least twice that of the first spacer plate, such length being sufficient to further align the fibers in the food mixture stream to a continuous aligned state, and a die plate comprised of a plurality of orifices positioned to receive the aligned food mixture stream discharged from the second spacer plate, through which orifices are discharged the transverse fibrous striated food product.

11. The apparatus of claim 10 wherein the length of the second spacer plate is about 2.1 to about 3.0 times the length of the first spacer plate.

12. The apparatus of claim 10 wherein the orifices of the die plate are tapered.

* * * * *